Figure 1:
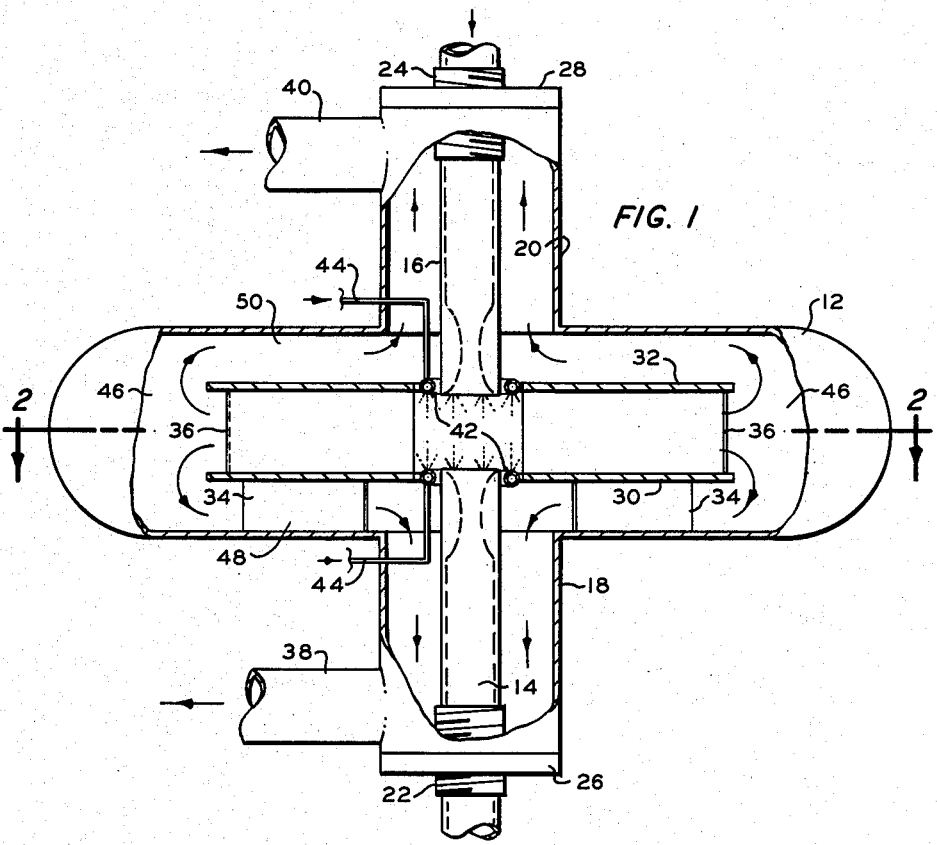

May 25, 1965  E. A. MALICK  3,185,740
FAST CHEMICAL REACTION AND PROCESS
Filed Nov. 4, 1960  2 Sheets-Sheet 1

INVENTOR.
E. A. MALICK
BY
Hudson & Young
ATTORNEYS

May 25, 1965 E. A. MALICK 3,185,740
FAST CHEMICAL REACTION AND PROCESS
Filed Nov. 4, 1960 2 Sheets-Sheet 2
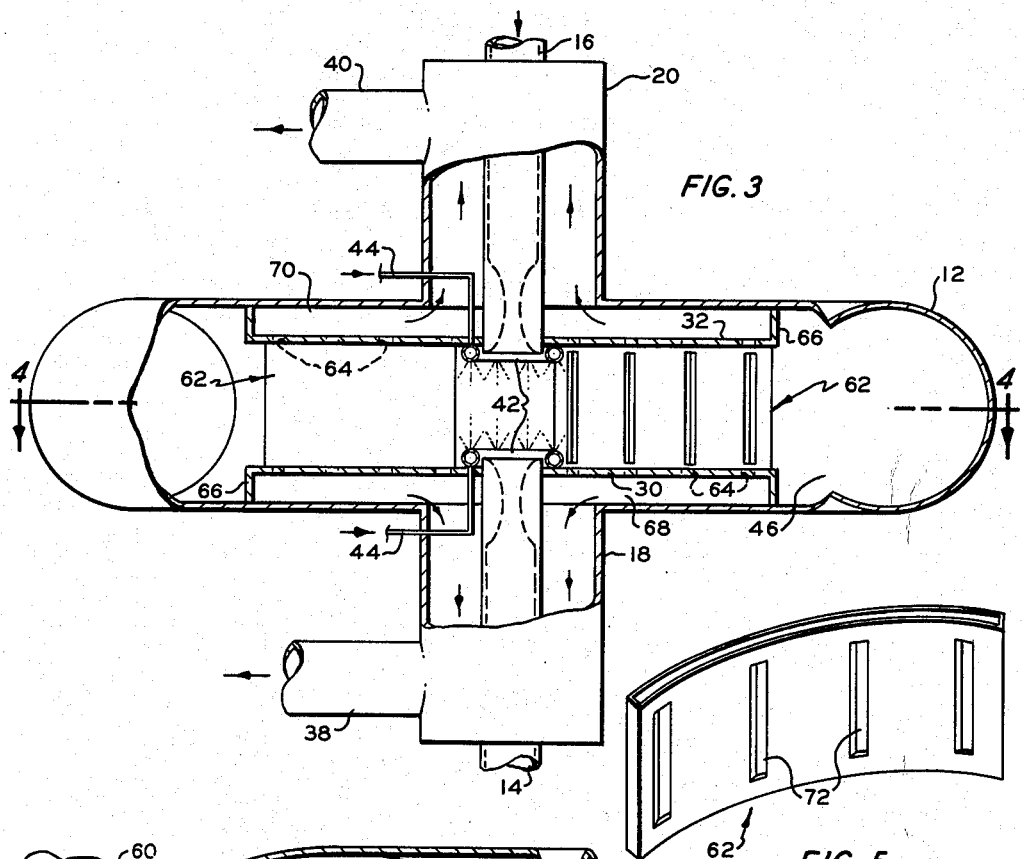
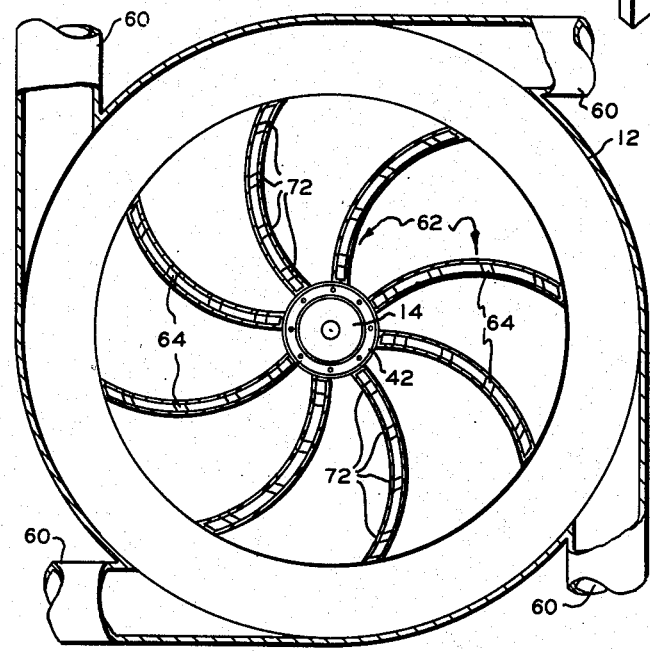
INVENTOR.
E. A. MALICK
BY Hudson & Young
ATTORNEYS

United States Patent Office 3,185,740
Patented May 25, 1965

---

3,185,740
FAST CHEMICAL REACTION AND PROCESS
Emil A. Malick, Bartlesville, Okla., assignor to Phillips Petroleum Company, a corporation of Delaware
Filed Nov. 4, 1960, Ser. No. 67,355
10 Claims. (Cl. 260—666)

This invention relates to a process and apparatus for effecting fast chemical reactions. A specific aspect of the invention pertains to the production of olefins by the oxidative dehydrogenation of saturated hydrocarbons and generally to the production of less saturated from more saturated hydrocarbons by oxidative dehydrogenation.

Various chemical reactions require fast reaction time and fast quenching so as to preserve the desired products resulting from the initial or early chemical reaction. The oxidative dehydrogenation of more saturated hydrocarbons to less saturated hydrocarbons, such as paraffins to olefins, is in this category. Prior art processes for carrying out oxidative dehydrogenation have been limited to reaction times of the order of 0.0001 second but even this fast reaction time results in a product which is an intermediate one with respect to time. It will be readily apparent that the products obtained are, among other things, directly related to reaction time and to the rapidity with which the reaction is stopped and the reactants removed from the reaction chamber. One of the best prior art processes for carrying out fast chemical reactions of the type referred to comprises injecting a mixture of fuel and oxidant into a reaction zone after which the reactants are passed through a converging-diverging nozzle which serves as a mixing zone and as a quenching zone. This process and apparatus for effecting same are the subject of the copending U.S. application of Marvin M. Johnson, Serial No. 787,053, filed January 15, 1959, now Patent No. 3,049,574. In this prior art process, reaction begins as the reactants contact each other. This is especially so when the reactants have been preheated. Reaction continues, although to a much lesser degree, as the reaction mixture travels through the mixing nozzle and is cooled.

This invention is concerned with a process and apparatus which effects faster reaction and better preservation of early and instant reaction products than prior art processes and is motivated by the discovery that better control of the reaction is effected by avoiding premixing of the reactants.

It is, therefore, an object of this invention to provide an improved process and apparatus for effecting more rapid chemical reactions and preserving the early reaction products. Another object is to provide an improved process for producing less saturated hydrocarbons by oxidative dehydrogenation of more saturated hydrocarbons with high product yields and to provide an apparatus for this process. A further object is to provide an improved process for the oxidative dehydrogenation of saturated hydrocarbons to produce olefins. Other objects of the invention will become apparent on consideration of the accompanying disclosure.

A broad aspect of the invention comprises directing a gaseous stream of a first reactant axially into a generally toroidal reaction chamber or zone at sonic to supersonic velocity, simultaneously directing a gaseous stream of a second reactant, readily reactable with said first reactant, axially into said chamber from the opposite side thereof at sonic to supersonic velocity so that the two streams impinge on each other forming shock waves of each reactant with substantially instantaneous mixing and reaction, withdrawing reaction products radially from the impingement area while expanding and quenching said products, and recovering quenched product from said zone.

The reactor comprises a substantially toroidal chamber having extending axially thereinto from opposite directions a pair of supersonic nozzles, such as De Laval nozzles. The nozzles are spaced apart a short but substantial distance and a pair of annular baffle plates are positioned, one each, adjacent the ends of the nozzles in a plane perpendicular to the nozzle or chamber axis. These two plates extend radially outwardly from the proximity of the nozzles a substantial portion of the radius of the chamber so as to leave an annular zone outside of the plates for passage of gases either into tangential outlets at the periphery of the chamber or through passageways formed between the plates and the adjacent walls of the chamber to an axial outlet surrounding the injection nozzles. In a preferred embodiment of the invention, curved vanes are positioned in a symmetrically spiralling pattern in the space between the plates substantially perpendicular thereto and extending from the proximity of the ends of the nozzles or the impingement area substantially to the outer periphery of the plates. Further embodiments of the apparatus of the invention will be described in connection with the drawings.

The process of the invention will be described in terms of oxidative dehydrogenation of saturated hydrocarbons, but it is to be understood it is within the scope of the invention to effect reaction between two or more other chemical reactants in the manner described in connection with the invention. The preheated oxidant and the preheated hydrocarbons are passed through separate diametrically opposite supersonic nozzles to produce a hydrocarbon-rich shock wave and an oxidant-rich shock wave, each shock wave impinging on the other to give instantaneous mixing and reaction. The resulting products are dispersed radially into a torus shaped take off zone which can be vaned to provide faster dispersion of products. The distance between the outlet and of the opposed nozzles may be varied to produce changes in the distance between shock waves, thus regulating the degree of mixing and the reaction time. This distance between nozzles may vary from about 1 to 10 internal nozzle diameters, depending upon the character of the reactants, the reaction time desired, and the reaction products to be produced.

The process of the invention is applicable to various chemical reactions such as the reaction of hydrocarbons with ammonia, condensation of hydrocarbons (benzene +acetylene+$O_2$ to produce a styrene), chlorination of hydrocarbons (cyclohexane+$Cl_2$+$O_2$ to produce chlorocyclohexane), production of sulfur chemicals (isopentane +$H_2S$+$O_2$ to produce isopentyl mercaptan), etc. However, it is particularly applicable to oxidative dehydrogenation of hydrocarbons.

Oxidative dehydrogenation of organic compounds is well known. The fundamental reaction may be illustrated by the equation:

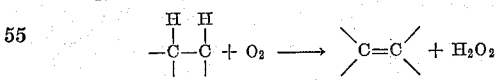

As may be seen from the equation the reaction involves removal of a hydrogen atom from each of two adjacent carbon atoms and the formation of a double bond between the carbon atoms, along with the formation of by product hydrogen peroxide.

The organic compounds which are preferably used as starting materials in the oxidative dehydrogenation process of this invention are those which have from 2 to 20 carbon atoms per molecule and which are readily vaporized at temperatures in the approximate range of 600 to 1800° F. Specific compounds which can be employed include saturated aliphatic compounds such as ethane, n-pentane, isopentane, 3-methylhexane, 2-methylheptane, n-octane, n-decane, n-eicosane, and the like. Cycloparaffins, such as cyclopentane, cyclohexane, and decahydronaphthalene, and substituted cycloparaffins, such as alkyl-substituted cycloparaffins, e.g., methylcyclopentane and methylcyclohexane, can also be advantageously employed in the practice of the present invention. When employing the acyclic and alicyclic hydrocarbons and alkyl substituted alicyclic hydrocarbons, good yields of the corresponding olefins are obtained. For example, good yields of pentenes can be obtained when using normal pentane as the starting material, or cyclohexane can be readily converted to cyclohexene. While the present invention is particularly applicable to saturated organic compounds, it is to be understood that unsaturated organic compounds can be used as starting materials. For example, alkyl-substituted aromatic compounds, such as ethyl benzene and isopropyl benzene, can be converted to alkenyl-substituted aromatic compounds, such as styrene and alpha-methyl styrene.

The oxidative dehydrogenation of the organic compounds is carried out with an oxidant such as oxygen or an oxygen-containing gas. It is usually preferred to employ air since the inert gases present in the air can be readily separated from the reaction products. However, pure oxygen can also be used, and its employment is often preferred when it is desired to eliminate the presence of inert gases. It is also within the scope of the invention to employ pure oxygen diluted with other gases, such as carbon dioxide and helium. Furthermore, combustion gases containing residual oxygen, preferably in amounts of 5 or more percent by volume, can be utilized.

The reaction of the organic compound with the oxygen-containing gas occurs at a temperature in the approximate range of 600 to 1800° F. Since the reaction involved is exothermic, it is unnecessary to supply heat to the reaction zone except, if desired, during the start-up of the process. Prior to introduction into the reaction zone, the reactant materials are preheated to a temperature sufficient to give the desired reaction temperature. It is to be understood that each of the gaseous reactant materials can be heated to the same temperature or to different temperatures. In general, the reaction is effected at pressure above atmospheric pressure. Reaction pressures in the range of 35 to 100,000 p.s.i.a., more desirably between 60 to 1,000 p.s.i.a., are employed. Since the reaction of this invention is carried out at temperature above critical temperature of the reactants, the gas phase reaction can also be carried out at very high pressures, e.g., up to about 100,000 p.s.i.a. The reaction rate is increased by raising the pressure in the reaction zone; so the actual pressure used will also be dependent upon the reaction rate which it is desired to obtain.

As seen from the formula set forth hereinabove, one molecule of oxygen is required for every olefinic group that is formed. The mol ratio of HC to $O_2$ can be as low as 0.5. However, in order to avoid the danger of forming explosive mixtures, it is usually preferred to utilize higher mol ratios of organic compound to oxygen. Thus, the mol ratio of the organic compound to oxygen is preferably at least 3 and more desirably at least 4. It is within the ambit of the invention to employ a mol ratio of organic compound to oxygen as high as 10 and even higher.

The reaction times employed in the process are less than 0.01 second and are generally in the range of 0.01 to 0.000001 second. The reaction products flow radially from the impingement area and, preferably, spirally in order to increase the rate of dispersion. During this dispersion of the reactants, the products are expanding rapidly and are being quenched. It is preferred to inject a quenching fluid into the reactants in the proximity of the impingement area so as to effect faster cooling and preservation of the products formed at the instant of reaction. Water may be used as a quench fluid but it is more effective to inject a refrigerant such as nitrogen, freon, or other cold gas or liquid which is inert with respect to the reaction products.

Figure 2:
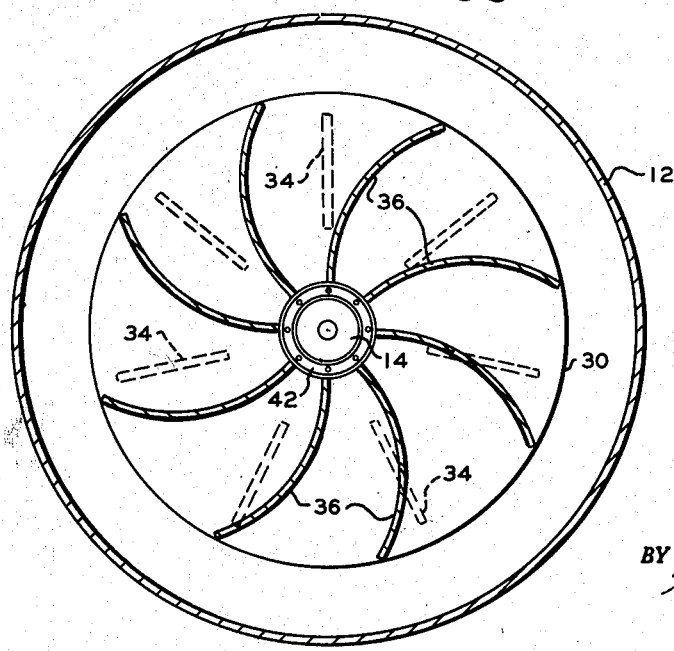

A more complete understanding of the invention is obtainable by referring to the accompanying schematic drawing in which FIGURE 1 is an axial partial section of one embodiment of the reactor of the invention; FIGURE 2 is a cross section of the apparatus of FIGURE 1 taken on the line 2—2; FIGURE 3 is a similar view to that of FIGURE 1 illustrating another embodiment of the invention; FIGURE 4 is a cross section of the reactor of FIGURE 3 taken on the line 4—4; and FIGURE 5 is a pictorial view of a vane suitable for use in the embodiment of the invention illustrated in FIGURES 3 and 4.

Referring to FIGURES 1 and 2, reactor 10 comprises a toroidal chamber 12, axially disposed supersonic nozzles 14 and 16 extending into the chamber a substantial distance through outlet conduits 18 and 20. Supersonic nozzles 14 and 16 are provided with expanded threaded sections 22 and 24, respectively, which engage threads in closure members 26 and 28 for adjustment of the extent of projection of the nozzles into the reactor. Annular plates 30 and 32 extend radially of the reactor from the proximity of the ends of the nozzles a substantial portion of the radius of the reaction chamber and lie in planes perpendicular to the nozzle axis and in the proximity of the ends of the nozzles. When supported in upright position, as shown in FIGURE 1, radially extending support ribs 34 are positioned between plate 30 and the adjacent wall of chamber 12 to support the entire baffle structure. Lying between plates 30 and 32 are upright vanes 36 which are symmetrically arranged and positioned in a spiral pattern to impart spiral flow to the gaseous reaction products being dispersed. This baffle and vane arrangement greatly facilitates dispersion of reaction products spirally from the reaction or impingement zone and recovery of the reaction products through outlet conduits 18 and 20 and take off lines 38 and 40, respecively. It is desirable to utilize at least three or four vanes per quadrant in order to effect desirable flow or dispersion of the reaction products.

The quench means comprises rings 42 which are perforate on the side adjacent the impingement zone and are provided with supply lines 44 which connect with a suitable supply of coolant or refrigerant (not shown). Conduits 38 and 40 lead to product separation equipment (not shown) which is conventional in the art.

In the apparatus of FIGURES 1 and 2, reactants are injected separately at sonic to supersonic velocity through nozzles 14 and 16 so that the streams of reactants impinge on each other in an area intermediate the ends of the nozzles to form separate shock waves with instantaneous mixing and reaction of the reactants. The reaction products are immediately rapidly dispersed spirally and radially from the impingement area between vanes 36 into the annular passageway 46 at the periphery of the reactor. The spiralling motion of the reactants continues through passageways 48 and 50 intermediate the plates 30 and 32, respectively, and the adjacent walls of the chamber. The spiralling gases then pass through conduits 18 and 20 to withdrawal conduits 38 and 40, respectively. Coolant injected through rings 42 is mixed with the reaction product and flows outwardly with the same, thereby effecting rapid quenching of the product which supplements the quenching effect of the spiral dispersion through an expanding zone or path.

Referring to FIGURES 3 and 4, corresponding parts are correspondingly numbered with respect to FIGURES 1 and 2. Nozzles 14 and 16 are similarly positioned in outlet conduits 18 and 20, respectively. These conduits may be made adjustable inwardly and outwardly of the reactor in the manner described in connection with FIGURE 1. The arrangement of the apparatus of these figures differs from that of the previous figures in withdrawing reaction products through tangential outlets 60 and in the use of perforate vanes 62 which are hollow so as to take off a portion of the reaction products through passageways 64 in plates 30 and 32. The space between plate 30 and the adjacent wall of chamber 12 is closed by annular ring 66 imposed between plate 30 and the wall of chamber 12 at the outer periphery of the plate. A similar structure is imposed on plate 32. This structure provides one path for products through hollow vanes 62, passageways 64, space 68, to conduits 18 and 38 or through space 70 to conduits 20 and 40. Product not passing through the perforate hollow vanes is dispersed radially outwardly from the impingement zone to annular space 46 from which it spirals into outlet conduits 60.

Vanes 62, as shown more clearly in FIGURE 5, are thin-walled arcuate vanes provided with slots or equivalent openings 72 for passing product to the interior of the vanes and to passageways 64 into plates to which the vanes are connected.

Because of the tremendous velocity of the reaction products leaving the impingement area and the spiralling movement thereof, enormous centrifugal force is involved whereby the heavier molecules, such as the olefins as compared to the $H_2O_2$ (produced in oxidative dehydrogenation) are forced to the outer periphery of the flow path along the perforate concave vane surface whereby the product take off through the vanes contains a substantially greater proportion of the heavier product than is found in the effluent product in the tangential outlets or in the total effluent. This facilitates the separation problem.

The perforations in the concave surface of the vanes may be of other configuration than the slots shown in the drawing such as rows of round holes, horizontal slots, etc. Likewise, passageways or openings 64 in the plates may be in any desired form. These slots are shown running transverse of the vanes but they may run longitudinally thereof as well. Thus, it can be seen that the embodiment of the reactor illustrated in FIGURES 3, 4, and 5 effects a partial separation of products, the stream containing heavier constituents being recovered through lines 38 and 40, while the stream containing a greater concentration of the lighter constituents is recovered through conduits 60.

Various modifications of the apparatus and process disclosed are within the scope of the invention. To illustrate, the reactor can have more than two oppositely placed nozzles and the centrifugal diffuser comprising the arcuate vanes may be replaced by straight radially extending vanes, particularly the embodiment illustrated in FIGURE 1. The reactor, while shown with the nozzles in vertical alignment, may be positioned with the nozzles in horizontal alignment by rotating the apparatus 90 degrees. In this position a series of plates 34 should also be included between annular baffle plate 32 and the adjacent chamber wall.

Certain modifications of the invention will become apparent to those skilled in the art and the illustrative details disclosed are not to be construed as imposing unnecessary limitations on the invention.

I claim:
1. A process for producing fast reaction between two reactants which comprises directing a gaseous stream of a first reactant axially into a generally toroidal zone at sonic to supersonic velocity; simultaneously directing a gaseous stream of a second reactant, readily reactable with said first reactant, axially into said zone from the opposite side thereof at sonic to supersonic velocity so that the two streams impinge on each other forming shock waves of each reactant with substantially instantaneous mixing and reaction; withdrawing reaction products radially of said zone directly from the impingment area while expanding and quenching same by injecting quench fluid into the reaction products in an annular pattern immediately surrounding said impingement area; and recovering quenched product from said zone.

2. A process for producing reaction products containing unsaturated hydrocarbon which comprises directing a gaseous stream of hydrocarbon amenable to oxidative dehydrogenation at elevated temperature and at a velocity of sonic to supersonic axially into a toroidal zone; simultaneously directing a stream of oxygen-containing gas at elevated temperature and at a velocity of sonic to supersonic axially into said zone from the opposite direction so that the two streams impinge on each other and form a hydrocarbon-rich shock wave and an oxidant-rich shock wave with instantaneous mixing and reaction of the oxygen and hydrocarbon to produce less saturated hydrocarbon; water squenching reaction product at the periphery of the impingement zone by injecting quench fluid around said periphery; passing quenched reaction product radially and spirally outwardly in said toroidal zone directly from the impingement zone; and recovering quenched product.

3. The process of claim 2 in which the temperature in the impingement area of said zone is in the range of 600 to 1800° F.; the pressure therein is in the range of 35 to 10,000 p.s.i.a.; and the contact time is less than 1 second.

4. The process of claim 2 in which the hydrocarbon feed is cyclohexane and said unsaturated product is cyclohexene.

5. The process of claim 2 in which the hydrocarbon feed is n-pentane and said unsaturated product is pentene.

6. The process of claim 2 in which the hydrocarbon feed is isopentane and said unsaturated product is isopentene.

7. The process of claim 2 in which the hydrocarbon feed is ethane and said unsaturated product is ethylene.

8. The process of claim 1 in which the quenched reaction product is spiralled outwardly in said zone.

9. The process of claim 8 in which the reaction products comprise a relatively high molecular weight material and a relatively low molecular weight material; the spiralling products are thrown against perforate baffles along their spiralling path so that the heavier molecules are at a higher concentration adjacent said baffles; and recovering a substantial portion of said product of higher molecular weight concentration thru the perforations in said baffles; and separately recovering the remaining portion of said products.

10. The process of claim 1 wherein said reaction is exothermic and reaction product is unstable at high temperatures, and including the step of injecting a regrigerant gas into said zone radially adjacent the impingement area to quench said product to a stable temperature.

References Cited by the Examiner

UNITED STATES PATENTS

| | | | |
|---|---|---|---|
| 2,441,528 | 5/48 | Bender et al. | 23—277 |
| 2,626,889 | 1/53 | Carney | 260—666 |
| 2,644,744 | 7/53 | Hartwig et al. | 260—683 |
| 2,661,380 | 12/53 | Orkin | 260—666 |
| 2,692,292 | 10/54 | Robinson | 260—666 |
| 2,763,699 | 9/56 | Van Dijk et al. | 260—666 X |
| 2,767,233 | 10/56 | Mullen et al. | 260—683 |
| 2,868,856 | 1/59 | Hale et al. | 260—683 X |
| 2,870,231 | 1/59 | Hughes et al. | 260—683 X |
| 2,890,253 | 6/59 | Mullineaux et al. | 260—666 |
| 2,989,380 | 6/61 | Weiss et al. | 23—277 |
| 3,049,574 | 8/62 | Johnson | 260—679 |

FOREIGN PATENTS 863,453   3/61   Great Britain.

ALPHONSO D. SULLIVAN, *Primary Examiner.*